United States Patent [19]

Shiraishi et al.

[11] Patent Number: 4,998,801

[45] Date of Patent: Mar. 12, 1991

[54] OPTICAL LOW-PASS FILTER AND PHOTOGRAPHIC SYSTEM USING THE SAME

[75] Inventors: Akihiko Shiraishi; Kazuo Fujibayashi, both of Kanagawa; Masatake Kato, Tokyo, all of Japan

[73] Assignee: Canon Kabushiki Kaisha, Tokyo, Japan

[21] Appl. No.: 379,221

[22] Filed: Jul. 13, 1989

[30] Foreign Application Priority Data

Jul. 18, 1988 [JP] Japan .................. 63-178737
Dec. 14, 1988 [JP] Japan .................. 63-315851

[51] Int. Cl.$^5$ .................. G02B 5/18; G02B 5/20; H04N 9/07
[52] U.S. Cl. .................. 350/162.2; 350/167; 350/311; 358/331
[58] Field of Search .......... 350/162.2, 162.21, 162.22, 350/167, 311; 358/331

[56] References Cited

U.S. PATENT DOCUMENTS

| | | | |
|---|---|---|---|
| 2,182,993 | 12/1939 | Moreno .................. | 350/167 |
| 2,605,434 | 7/1952 | Homrighous .................. | 350/167 |
| 3,781,091 | 12/1973 | Ferguson .................. | 350/167 |
| 3,784,734 | 1/1974 | Watanabe et al. .................. | 350/404 |
| 3,821,795 | 6/1974 | Okano .................. | 350/162.2 |
| 3,940,788 | 2/1976 | Abe et al. .................. | 350/162.2 |
| 4,330,175 | 5/1982 | Fujii et al. .................. | 350/162.22 |
| 4,405,405 | 9/1983 | Fujii et al. .................. | 350/162.21 |
| 4,634,219 | 1/1987 | Suzuki .................. | 350/162.22 |
| 4,759,607 | 7/1988 | Kawatsuki et al. .................. | 350/162.21 |
| 4,795,236 | 1/1989 | Ise .................. | 350/162.2 |

OTHER PUBLICATIONS

Savitskii et al, "Efficiency Optimization of Reflecting Diffraction Graftings with a Trapezoidal Grating Profile," *Opt. Spectrosc.*, vol. 59, No. 2, USSR, Aug. 1985, pp. 251-254.

*Primary Examiner*—Bruce Y. Arnold
*Assistant Examiner*—Martin Lerner
*Attorney, Agent, or Firm*—Fitzpatrick, Cella, Harper & Scinto

[57] ABSTRACT

An optical low-pass filter formed in a trapezoid wave profile having the top and bottom sides of lengths "a" and "b" respectively, a height "$\delta$" thereof and a length of one period thereof and made from a material having a refractive index "n", and satisfying the following conditions: for a wavelength of $\lambda_M \geq 1.6 \lambda m$, $$\frac{\lambda_D - \lambda_m}{\lambda_M - \lambda_m} \geq 0.3$$

$0.35 \leq \epsilon \leq 0.65$
$-0.26 \leq \mu \leq 0.26$
where
$$\epsilon = \frac{a+b}{d}, \mu = \frac{a-b}{d}$$

$$\lambda_D = \text{MIN}\left(\frac{2\text{MIN}(a,b)}{d}, 1 - \epsilon\right) \times \frac{2(n-1)\delta}{1 - \epsilon}$$

wherein $\lambda_M$ and $\lambda m$ are respectively maximum and minimum wavelengths in a wavelength range in which the filter works, and MIN(x,y) represents the smaller one of values which variables x and y take.

4 Claims, 6 Drawing Sheets

OPTICAL LOW-PASS FILTER AND PHOTOGRAPHIC SYSTEM USING THE SAME

BACKGROUND OF THE INVENTION

1. Field of the Invention

This invention relates to photographic systems having optical low-pass filters and, more particularly, to photographic systems having low-pass filters suited to dispersively obtain an image by using an image pickup tube, image pickup board, etc. in video cameras, electronic still cameras, etc.

2. Description of the Related Art

Video cameras using a solid state image pickup element of dispersive resolving cell structure have to generally optically perform space sampling when the output of an image is obtained. In this case, if the light from an object to be photographed includes components of higher spatial frequency than the sampling frequency, spurious signals depicting a texture and color shades that the object does not possess are generated. In other words, since frequency components which cannot be picked up by the photographic apparatus (or components of higher frequency than the Nyquist frequency), cannot be reproduced, a phenomenon called wave distortion (aliasing) arises, contributing to forming moiré, false colors, and other defects in the picture taken.

For this reason, it has been the common practice in the art to use an optical low-pass filter arranged to constitute part of the photographic system so that the high spatial frequency components of the object are limited. Many such optical low-pass filters are in the form of a quartz plate or the like utilizing double refraction.

Figure 6:
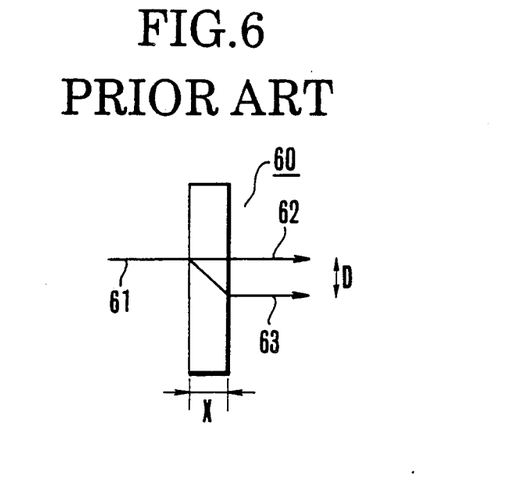
FIGS. 6 and 8 schematically illustrate the conventional optical low-pass filter.

FIG. 6 is a diagram to explain a conventional optical low-pass filter 60 using the quartz plate to utilize double refraction. In the same figure, an entering light beam 61 is split into two parts, or an ordinary ray 62 and an extraordinary ray 63, to obtain the low-pass effect. Here, letting the distance between these split rays be denoted by D and the spatial frequency by f, the modulation transfer function, or so-called MTF(f), becomes a cosine function as follows:

$$MTF(f) = |\cos \pi D f| \quad (1)$$

Figure 7:
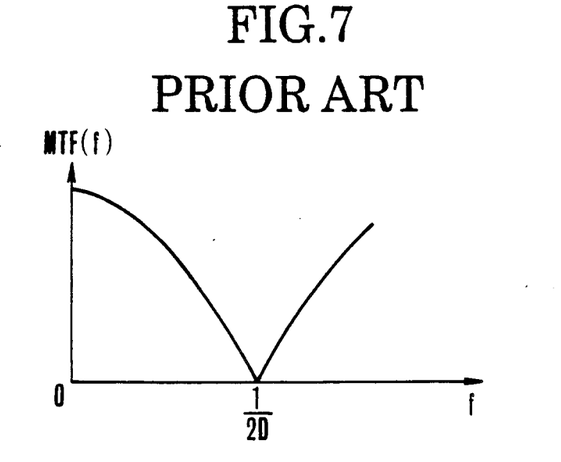
FIGS. 7 and 10 illustrate the modulation transfer functions MTF(f) of the conventional optical low-pass filters.

FIG. 7 is a graphic representation of this modulation transfer function MTF(f). As is understandable from this graph, the prescribed spatial frequency component included in the object can be controlled by controlling the thickness of the quartz plate.

However, the quartz plate is expensive and, moreover, the split light beam becomes a linearly polarized beam. In a case where it is desired to split it to, for example, two or more directions, the polarized state must be changed by using a phase plate. Therefore, the optical low-pass filter of this kind gets thicker. Hence, there is a drawback that the production cost becomes even higher.

Figure 8:
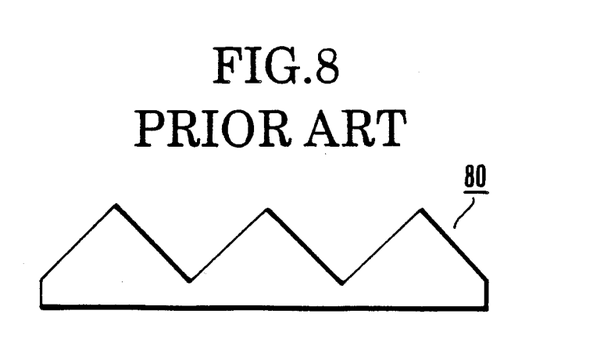

On the other hand, Japanese Laid-Open Patent Application No. Sho 53-119063 proposes another optical low-pass filter which utilizes a phase type diffraction grating. FIG. 8 shows the profile of the optical low-pass filter proposed in this publication and is formed as a series of triangles by using acrylic resin.

Figure 9:
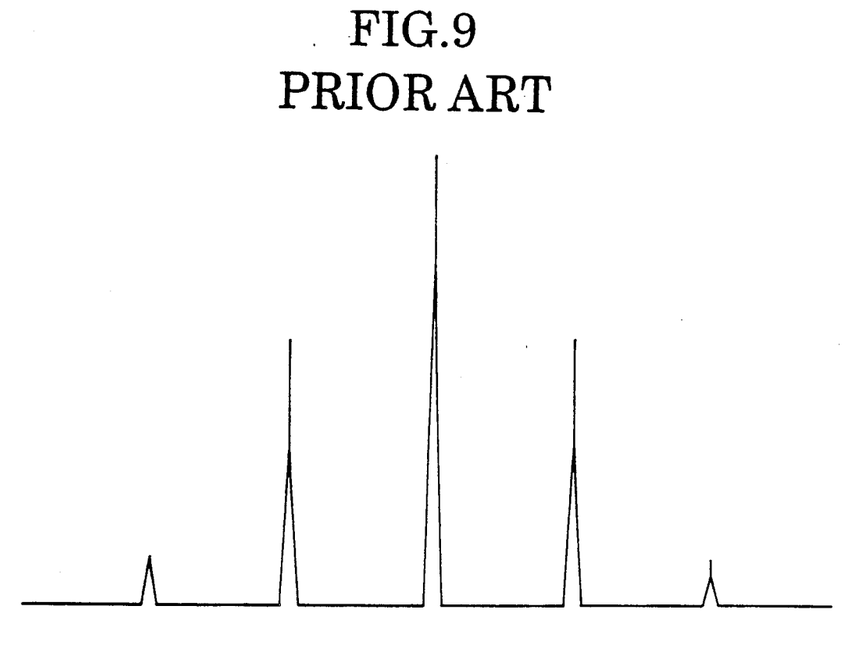
FIG. 9 illustrates an intensity distribution of a point image produced by the optical low-pass filter shown in FIG. 8.
Figure 10:
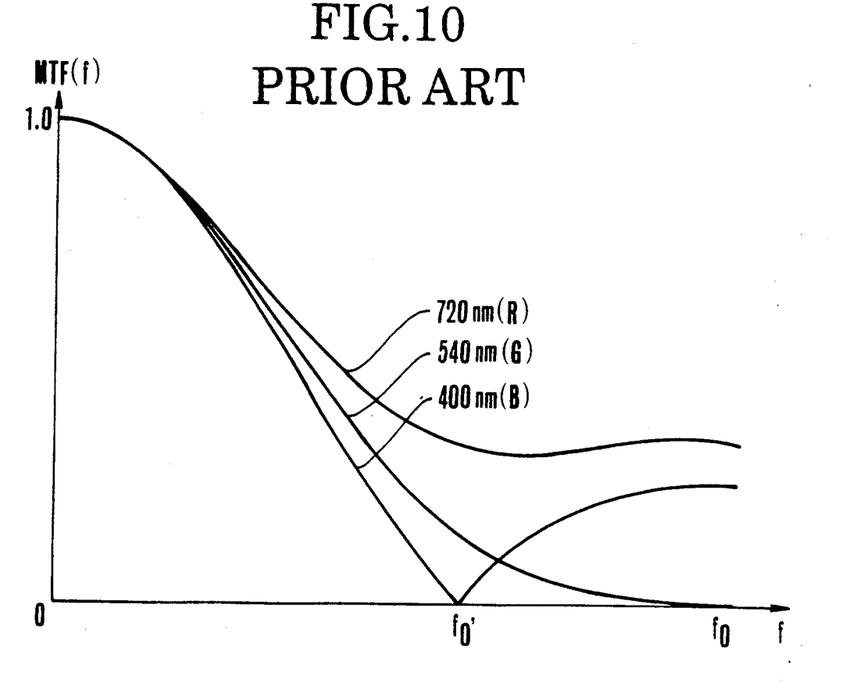

This optical low-pass filter has its diffracting effect form, for example, a point image expanded in one direction with the intensity distribution shown in FIG. 9. By this, the low-pass effect is likewise obtained as with the quartz plate. FIG. 10 is a graphic representation of the modulation transfer function MTF(f) of the optical low-pass filter shown in FIG. 8.

Meanwhile, optical parts to be used in the video camera, electronic still camera, etc. are required in a general case to assure their optical performances in a relatively wide wavelength range near or at the visible light region.

The video camera, for example, is required to have its prescribed optical performance operate well in a range of wavelengths 400 nm to 720 nm.

Nonetheless, the optical low-pass filter shown in FIG. 8, because of its diffracting effect varying with wavelength, forms different point images with different wavelengths. That is, as shown in FIG. 10, the MTF characteristic changes depending on the wavelength.

For example, with the use of the diffraction grating of triangular profile shown in FIG. 8, when the design wavelength is taken at $\lambda = 540$ nm to obtain an MTF characteristic shown by the curve G of FIG. 10, a value of the spatial frequency for the wave length $\lambda = 400$ nm at which the MTF value becomes "0", i.e., the trap frequency $f_0'$, as shown by the curve B of FIG. 10, smaller than the trap frequency $f_0$ for the curve G. Conversely, when $\lambda = 720$ nm, the MTF value never takes the value of "0" as shown by the curve R in the same figure, thus failing to have a trap frequency.

In such a manner, the low-pass filter of such a profile as shown in FIG. 8 differentiates the MTF value as the wavelength varies. Therefore, its resolving power is poor, and its use leads to the production of moiré patterns and false colors.

For the low-pass filter of the diffraction grating type, besides the profile of a series of triangles, many other forms such as sine curve, or a series of trapezoids, have been attempted. U.S. Pat. Nos. 3,821,795 and 3,784,734 and Japanese Laid-Open Patent Application No. Sho 45-29614 disclose low-pass filters of trapezoid profile.

To realize the low-pass filter of trapezoid profile, there is a strong demand for improvement of the contrast in the low frequency band and reduction of the wavelength dependency.

SUMMARY OF THE INVENTION

An object of the invention is to provide an optical low-pass filter of almost equal trap frequency in a certain wavelength range so that a uniform low pass effect is obtained, in other words, the MTF characteristic varies little with wavelength, and a photographic system having the same.

DETAILED DESCRIPTION OF THE PREFERRED EMBODIMENTS

Figure 1A:
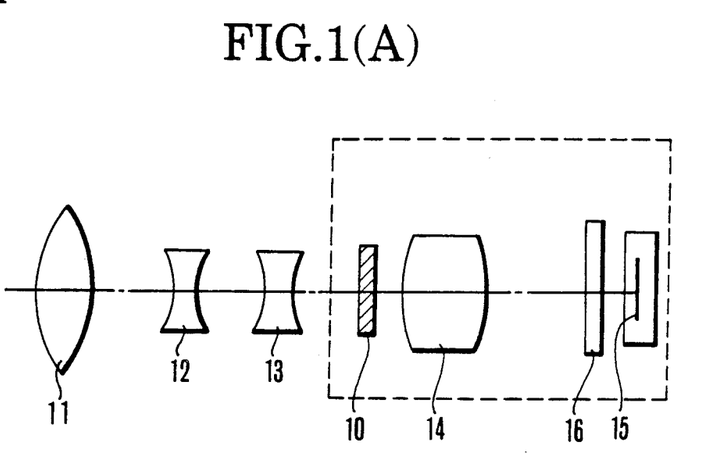
FIG. 1(A) is a schematic view of an embodiment of an optical system according to the invention.
Figure 1B:
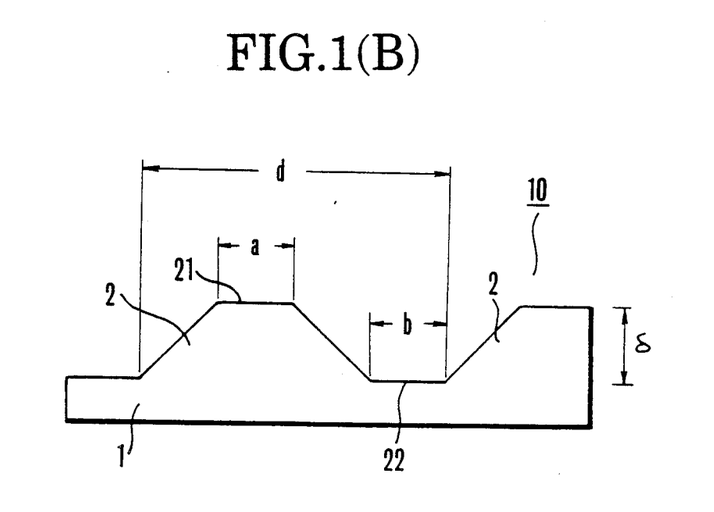
FIG. 1(B) is a diagram to explain the shape of the profile of the optical low-pass filter according to the invention.

FIG. 1(A) schematically shows an embodiment of a photographic system having the optical low-pass filter of the invention. FIG. 1(B) is a diagram of the geometry to explain the design of the profile of the low pass filter shown in FIG. 1(A).

This embodiment is shown as applied to a zoom lens in a photographic system.

In FIG. 1(A), the zoom lens comprises, from front to rear, a first lens unit 11 for focusing, a second lens unit 12 axially movable for varying the image magnification, a third lens unit 13 axially movable for compensating for the image shift resulting from the variation of the image magnification, and a fourth lens unit 14 for image formation. An optical low-pass filter 10 is arranged to constitute part of the photographic system. In this embodiment, it is arranged in a space between the third lens unit 13 and the fourth lens unit 14. 15 represents the image receiving surface of a solid-state image sensor. 16 is a filter for color separation.

The optical low-pass filter 10 in this embodiment, as shown in FIG. 1(B), is formed by putting on a substrate 1 a trapezoid member 2 comprising a periodic structure whose cross-section is of trapezoid shape so that the passing light beam is given the diffracting effect. The optical low-pass filter shown in FIG. 1(B) has the following features:

The profile is of trapezoid wave shape. Letting the width of a flat portion of the top side of the trapezoid be denoted by "a", the width of a flat portion of the bottom side by "b", the height by "δ", the length of one period by "d", the refractive index of the medium of the trapezoid member 2 by "n", and the maximum and minimum wavelengths of a used range by $\lambda_M$ and $\lambda_m$ respectively, for a wavelength region of $\lambda_M \geq 1.6 \lambda_m$, $$\epsilon = \frac{a+b}{d}, \mu = \frac{a-b}{d} \quad (2)$$

$$\lambda_D = \text{MIN}\left(\frac{2\text{MIN}(a,b)}{d}, 1-\epsilon\right) \times \frac{2(n-1)\delta}{1-\epsilon} \quad (3)$$

each lie in the following range:

$$\frac{\lambda_D - \lambda_m}{\lambda_M - \lambda_m} \geq 0.3 \quad (4)$$

$$0.35 \leq \epsilon \leq 0.65 \quad (5)$$

$$-0.26 \leq \mu \leq 0.26 \quad (6)$$

where MIN(x, y) represents the smaller one of the values the variables x and y take. Also, the used wavelength range is determined by an integral property obtained by combining properties of constituent components arranged from an objective lens to an image sensor. By setting forth these equalities and inequalities of conditions (2) to (6) for the trapezoid wave and utilizing the diffraction, the prescribed low-pass effect is given to the object image.

In a case where the optical low-pass filter utilizing the diffracting effect as in this embodiment is arranged to constitute part of the photographic system, the low-pass effect is caused to differ by the distance R from that filter to the focal plane of the photographic system.

Here, the distance R refers to what is called the "optically equivalent" distance. Particularly when the optical low-pass filter is positioned in the interior of the photographic system, the distance R is caused to change depending on the image forming action of that lens system which occupies the space on the image side of the filter.

Figure 1C:
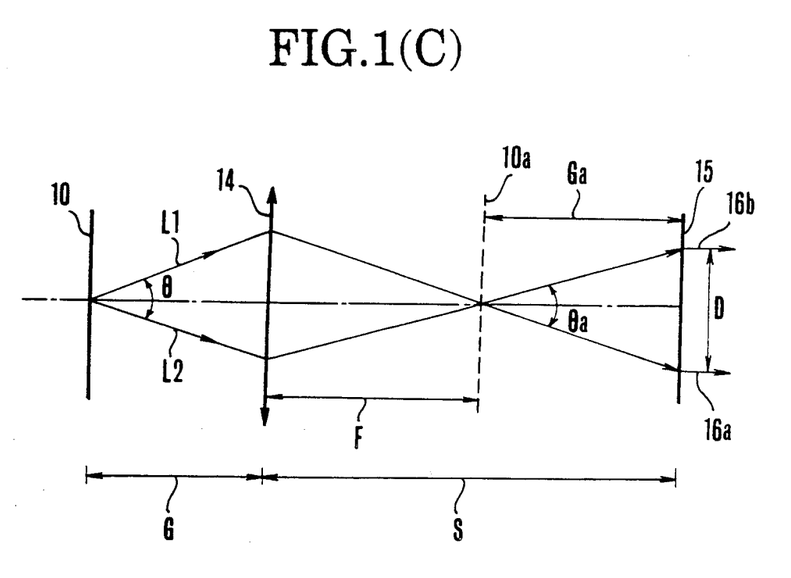
FIG. 1(C) is a diagram of the geometry of light rays traveling through part of the system of FIG. 1(A).

FIG. 1(C) schematically shows the elements in a dashed line block of FIG. 1(A). In FIG. 1(C), the optical low-pass filter 10 in front of the fourth lens unit 14 produces diffracted rays, of which, for example, ±1st order diffracted rays L1 and L2 respectively arrive at the image plane 15 as point images 16a and 16b. For this case, D: the distance between the point images 16a and 16b produced by the diffracted rays L1 and L2 on the image plane 15;
F: the focal length of the lens unit 14;
G: the distance from the front principal plane of the lens unit 14 to the optical low-pass filter 10; and
S: the distance from the rear principal plane of the lens unit 14 to the image plane 15
are defined.

Then, for an image 10a of the optical low-pass filter 10 formed by the lens unit 14, the distance Ga from the image 10a to the image plane 15 is given by the following expression:

$$Ga = S - \frac{G \cdot F}{G - F} \quad (7)$$

The magnifying power $\beta$ of the lens unit 14 also is expressed as $$\beta = \frac{F}{F - G} \quad (8)$$

Therefore, the beam split angle $\theta$ of the optical low-pass filter 10 and its conjugate beam split angle $\theta a$ of the image 10a are in the following relationship:

$$\theta a = \theta/\beta = \frac{F - G}{F} \cdot \theta \quad (9)$$

From the equations (7) and (9), the interval D between the point images 16a and 16b is then given by $$D = |\theta a \cdot Ga| \quad (10)$$

$$= \left|\left(S + G - \frac{S \cdot G}{F}\right) \cdot \theta\right|$$

Here, defining $$R = S + G - \frac{S \cdot G}{F} \quad (11)$$

the following equation is obtained:

$$D = |R \cdot \theta| \quad (12)$$

This means that the optical low-pass filter in the optical system shown in FIG. 1(C) can be treated as if it were in a position at the distance R defined by the equation (11) from the image plane 15.

Thus, the distance R corresponds to an so-called optically equivalent distance from the optical low-pass filter 10 to the image plane 15.

Of course, if other filters are used in the optical path, their total thickness must be converted into a length in the air by taking into account their refractive indices.

The optically equivalent distance R, if, for example, no lens exists in the space from the optical low-pass filter to the image plane, as the focal length $F=\infty$, following equation is obtained from the equation (11):

$$R=S+G$$

This is equal to the real distance itself from the optical low-pass filter to the image plane.

Also, if a position where the optical low-pass filter is arranged is in the afocal part in the optical system, as the focal length $F=S$, the following equation is obtained from the equation (11):

$$R=F$$

Thus, the distance R is equalized to the focal length F.

Hence, in the present embodiment, to arrange the optical low-pass filter within the photographic system, determination of the form and others of the optical low-pass filter is made by taking into account the optically equivalent distance R.

Next, the low-pass performance in actual practice of the optical low-pass filter in the present embodiment is described.

With the optical low-pass filter formed to the trapezoid shape in profile shown in FIG. 1(B), letting the spatial frequency be denoted by f, the optically equivalent distance from the optical low-pass filter to the image plane by R, the refractive index of the trapezoid member 2 by n and the wavelength by $\lambda$, the modulation transfer function MTF(f) by that optical low-pass filter, when $$0 \leq \xi \leq \text{MIN}\left(\frac{2\text{MIN}(a,b)}{d}, 1-\epsilon\right), \quad (13)$$

is given by $$MTF(f) = |F_f(\xi)| \quad (14),$$

where $$\xi = f/fc \quad (15)$$

$$f_c = d/(2\lambda R) \quad (16)$$

$$\gamma = 2(n-1)\delta/\lambda \quad (17)$$

$$\epsilon = \frac{a+b}{d} \quad (18)$$

wherein

-continued $$F_f(\xi) = (2\epsilon - 1) + \quad (19)$$

$$[(1-\epsilon)-\xi]\left(\cos\frac{\gamma\pi}{1-\epsilon}\xi + 1\right) +$$

$$\frac{2(1-\epsilon)}{\gamma\pi}\sin\frac{\gamma\pi}{1-\epsilon}\xi$$

It should be noted that fc is the spatial frequency for the wavelength $\lambda$ of the intervals of the diffraction image on the image plane, $\xi$ is the spatial frequency normalized in terms of the spatial frequency fc. $\gamma$ is the phase retardation of the trapezoid member 2, and $\epsilon$ is the parameter concerning the shape of the trapezoid member 2.

For this case, if the spatial frequency has its value $\xi_0$ defined by $$\xi_0 = \frac{1-\epsilon}{\gamma} \quad (20)$$

fall in the range of the inequalities (13), $$F_f(\xi_0) = 2\epsilon - 1 \quad (21)$$

always results.

Denoting the corresponding value of the spatial frequency by $f_0$, the following equation is obtained:

$$f_0 = (1-\epsilon)d/(4(n-1)\delta R) \quad (22)$$

At this value, $$MTF(f_0) = |2\epsilon - 1| \quad (23)$$

is always established.

Since, as is understood from the equation (22), the spatial frequency $f_0$ does not depend on the wavelength $\lambda$, it results from the equation (23) that the optical low-pass filter in the present embodiment has always a constant convergent point ($f_0$, MTF($f_0$)).

If the value of the MTF at this convergent point, or MTF($f_0$), is sufficiently small, an optical low-pass filter whose trap frequency near or at the convergent point is always constant independently of the wavelength $\lambda$ can be obtained.

That is, the shape of the trapezoid member may be so determined that the value of the parameter $\epsilon$ lies within the range defined by the inequalities (5).

Further, the condition that allows such a constant trap frequency $f_0$ to be obtained is given by $$\lambda \leq \lambda_D \quad (24)$$

$$\lambda_D = \text{MIN}\left(\frac{2\text{MIN}(a,b)}{d}, 1-\epsilon\right) \cdot \frac{2(n-1)\delta}{1-\epsilon} \quad (25)$$

This means that when the wavelength $\lambda$ has a lower value than $\lambda_D$, there exists the convergent point ($f_0$, MTF($f_0$)) on each wavelength MTF's curve of the optical low-pass filter. If this value $\lambda_D$ is chosen as the design wavelength, and an optical low-pass filter is formed so as to satisfy the inequality (4), for wavelengths near or at $\lambda_D$ or below it, a constant characteristic of MTF can always be obtained.

Further, in order to obtain an optical low-pass filter of good performance, it is desirable that the difference between the widths of the flat portion "a" of the top side and the flat portion "b" of the bottom side, i.e., $|a-b|$, is not too large relative to the pitch "d" as indicated by the equation (2) and the inequalities (6). This is discussed below.

Now suppose an optical low-pass filter A is configuring within a range satisfying:

$$\frac{2\text{MIN}(a_A,b_A)}{d} \geq 1 - \epsilon_A \quad (26)$$

then the design wavelength $\lambda_D$ has the following value:

$$\lambda_{DA} = 2(n-1)\delta \quad (27)$$

For another optical low-pass filter B whose height $\delta$ and pitch "d" are equal to those of the filter A but whose shape (the top flat portion "a", the bottom flat portion "b") is different, if $$\frac{\text{MIN}(a_A,b_B)}{d} < 1 - \epsilon_A \quad (28)$$

is satisfied, the design wavelength takes a value expressed by $$\lambda_{DB} = \frac{\text{MIN}(a_B,b_B)}{d} \cdot \frac{4(n-1)\delta}{1-\epsilon_B} \quad (29)$$

Now, let us bring the convergent points of these optical low-pass filters A and B, i.e., $(f_{0A}, \text{MTF}(f_{0A}))$ and $(f_{0B}, \text{MTF}(f_{0B}))$, into coincidence.

To do this, the following equation is obtained from the equation (23):

$$\text{MTF}(f_{0i}) = |2\epsilon_i - 1| \quad (30)$$

$(i = A, B)$

Thus, the $\epsilon_A$ and $\epsilon_B$ are constant values. Hence, it is necessary to set forth:

$$\epsilon_A = \epsilon_B = \epsilon \quad (31)$$

For this case, $\lambda_{DA}$ does not depend on the values of the "a" and "b". So, it does not change. $\lambda_{DB}$, on the other hand, decreases in proportion to the value of the "a" or "b". If the value of $\lambda_{DB}$ becomes too small, the wavelength range defined by the inequality (24), in which the characteristic of MTF can be maintained constant, cannot be got sufficiently wide. This is not desirable. So, the ratio $\lambda_{DB}/\lambda_{DA}$ is considered. The equations (27), (29) and (31) give $$\frac{\lambda_{DB}}{\lambda_{DA}} = \frac{\text{MIN}(a_B,b_B)}{d} \cdot \frac{2}{1-\epsilon}$$

$$= \left(1 - \frac{|a-b|}{d}\right) \cdot \frac{1}{1-\epsilon} - 1$$

Here, defining $$\mu = \frac{a-b}{d} \quad (2)'$$

the following equation is obtained:

$$\frac{\lambda_{DB}}{\lambda_{DA}} = (1 - |\mu|) \cdot \frac{1}{1-\epsilon} - 1 \quad (32)$$

From the equation (32), the value of $\lambda_{DB}/\lambda_{DA}$, if the value of the "$\beta$" is constant, depends only on the "$\mu$". When the absolute value of the "$\mu$" is sufficiently small, the value of $\lambda_{DB}/\lambda_{DA}$ is sufficiently large. Hence, even if the optical low-pass filter B lies in the range defined by the equation (28), the range: $\lambda \leq \lambda_{DB}$ for maintaining the constant characteristic of MTF can be taken sufficiently wide. For this purpose, all that is necessary is to set forth $$-0.26 \leq \mu \leq 0.26 \quad (6)$$

Based on the foregoing analysis, the present invention has set forth the before-described equalities and inequalities of conditions (2) to (6). By configuring the trapezoid wave in the profile so as to satisfy these conditions, a low-pass filter applicable to the photographic system of the video camera or the like is made to bring advantageous effects its effect into full play. When these conditions are violated, it becomes difficult for the use of the trapezoid wave shape to assure production of the low-pass performance, which results in, for example, that the trap frequency is maintained at a constant value over the predetermined wavelength range, and that those values which the MTF takes in the low frequency region are maintained high, while the MTF values in the high frequency region are advantageously lowered.

Though the features (2) to (6) of the invention suffice for realizing a optical low-pass filter of desired characteristics, a much desired one which has the uniform MTF characteristic over an extended wavelength range can be obtained when the difference in width between the top flat portion "a" and the bottom flat portion "b" is as small as possible, as has been mentioned in connection with the deduction of the inequalities (6). Therefore, it is desirable to further set forth $$a = b \quad (33)$$

Yet another desirable condition is that the MTF value at the convergent point $(f_0, \text{MTF}(f_0))$ is as follows:

$$\text{MTF}(f_0) = |2\epsilon - 1| = 0$$

Hence, $$\epsilon = \frac{a+b}{d} = \tfrac{1}{2} \quad (34)$$

From the equations (33) and (34), the ratio of the "a" or "b" to the "d" is found as follows:

$$\frac{a}{d} = \frac{b}{d} = 0.25 \quad (35)$$

This may be considered to give the most efficient form of the optical low-pass filter. Accordingly, it is desirable that the ratios a/d and b/d have values near or at 0.25. In actual practice, ranges for them may be given as follows:

$$0.2 \leq a/d \leq 0.3 \quad (36)$$

$$0.2 \leq b/d \leq 0.3 \quad (37)$$

In this connection, it should be noted that the MTF characteristic remains constant in the following range:

$$\lambda \leq \lambda_D \quad (5)$$

where $$\lambda_D = 2(n-1)\delta$$

Now suppose the trapezoid member 2 to be formed on the substrate 1 is made of acrylic resin, or other plastics, or optical glass. Then, since the refractive index "n" of such a trapezoid member 2 is usually $n=1.5$ or thereabout, $$\lambda_D = \delta \quad (38)$$

is obtained.

If this value $\lambda_D$ is chosen to be the design wavelength, or if the height $\delta$ of the shape of the trapezoid wave is set equal to about the wavelength to be used, an optical low-pass filter whose trap frequency is made constant in the range of wavelengths equal to and lower than the value $\lambda_D$. By applying the equation (38) to the equality or inequality (4), it is found that for that purpose, $$\frac{\delta - \lambda_m}{\lambda_M - \lambda_m} \geq 0.3 \quad (39)$$

may be set forth.

Based on the foregoing further analysis, the present invention has set forth the additional inequalities of conditions (36), (37) and (39). By figuring the shape of the trapezoid wave so as to satisfy these conditions, the optical low-pass filter when applied to the photographic system of the video camera or the like, produces an improved low-pass effect. When the conditions (36), (37) and (39) are violated, it becomes difficult to achieve a much desired improvement of the low-pass effect owing to the employment of the trapezoid wave in the profile with advantages, for example, that the the trap frequency is maintained constant over the prescribed extended wavelength range, and that the MTF values in the high frequency region are effectively lowered in such a manner that the MTF values in the low frequency region are preserved high.

Next, the present invention will be described in connection with specific embodiments thereof.

In these embodiments, the optical low-pass filter is designed to work in a visible light region (from $\lambda m = 380$ nm to $\lambda_M = 740$ nm$_x$).

FIG. 2 to FIG. 5 show the variation of the modulation transfer functions MTF(f) for the three primary colors with variation of the shape of the trapezoid wave in the profile as the specific embodiments 1 to 4 differ with different values of the design parameters, a, b, $\delta$, d and n where "a" is the length of the flat portion of the top side of the trapezoid, "b" is the length of the flat portion of the bottom side, "$\delta$" is the height, "d" is the length of one period, and "n" is the refractive index of the material of the trapezoid member 2.

Figure 2:
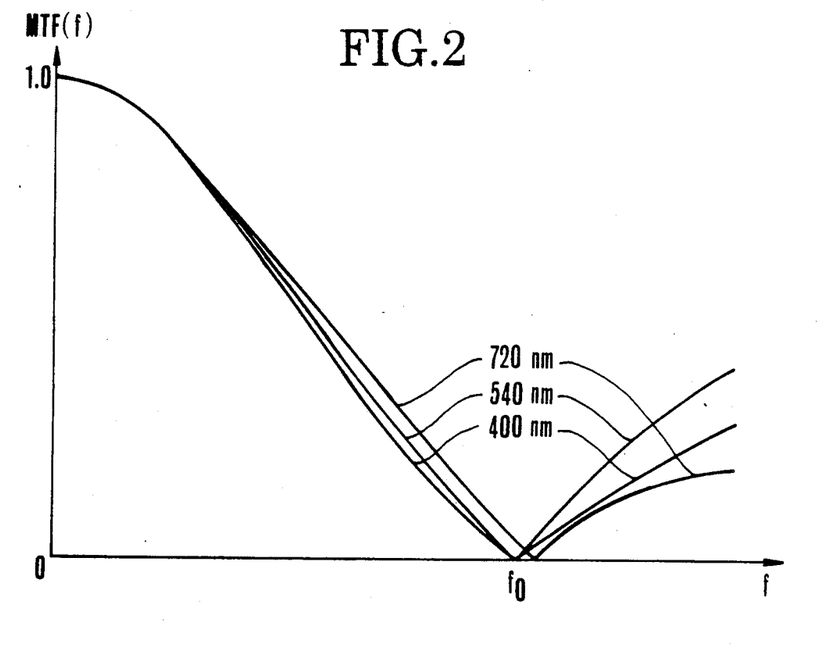
FIGS. 2 to 5 are graphic representations of the values of the modulation transfer functions MTF(f) of the optical low-pass filters of the invention respectively.

Embodiment 1 shown in FIG. 2:
a = 118 μm,
b = 118 μm,
d = 474 nm,
δ = 0.54 μm,
n = 1.49.

Figure 3:
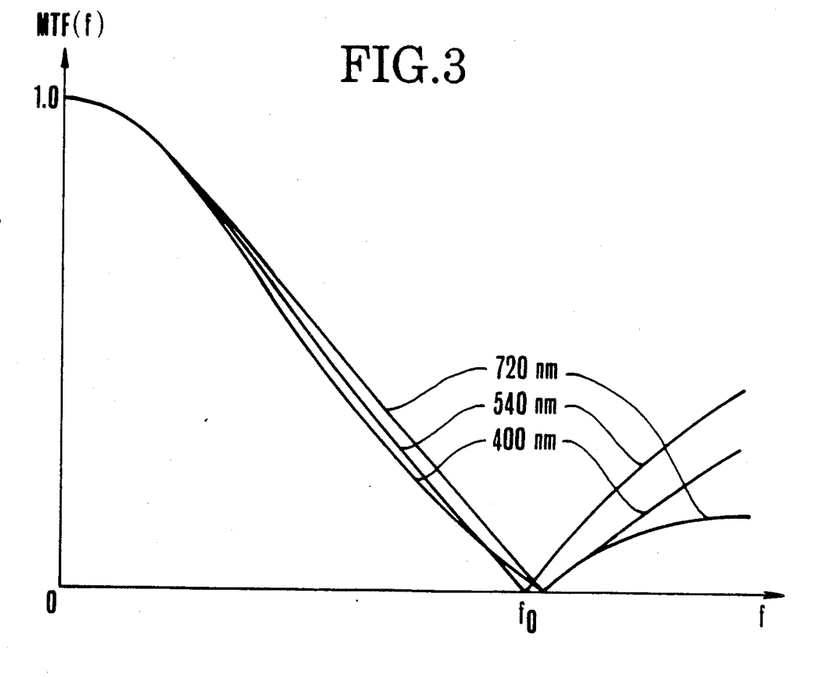

Embodiment 2 shown in FIG. 3:
a = 112 μm,
b = 134 μm,
d = 447 nm
δ = 0.51 μm,
n = 1.49.

Figure 4:
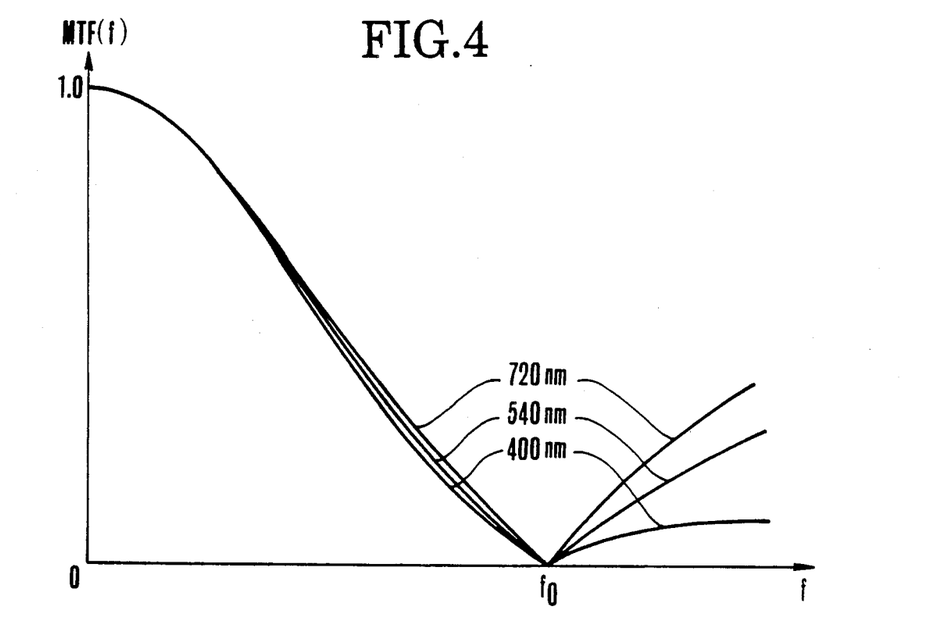

Embodiment 3 shown in FIG. 4:
a = 160 μm,
b = 160 μm, d = 640 nm,
δ = 0.73 μm,
n = 1.49.

Figure 5:
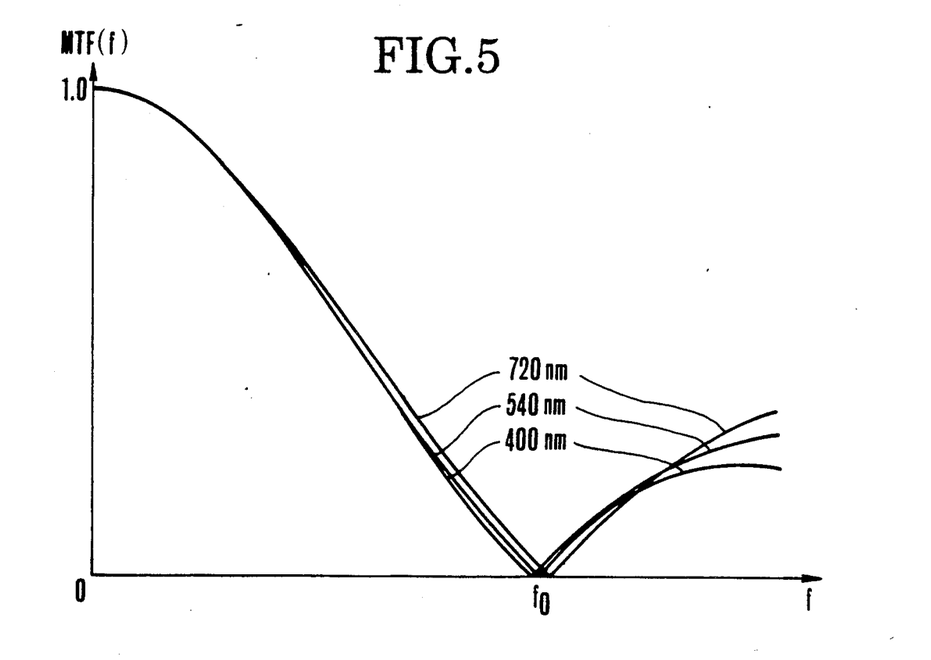

Embodiment 4 shown in FIG. 5:
a = 176 μm,
b = 176 μm,
d = 877 nm,
δ = 1 μm,
n = 1.49.

It is to be noted in these graphs that because the frequency $f_0$ on the abscissa, as is understandable from the equation (22), varies in inverse proportion to the distance R from the optical low-pass filter to the image plane, it is taken arbitrarily.

| | The Values of Factors in Conditions | | | |
|---|---|---|---|---|
| | Embodiment | | | |
| Factor | 1 | 2 | 3 | 4 |
| ε | 0.5 | 0.55 | 0.5 | 0.4 |
| $\lambda_D$ (nm) | 529 | 500 | 715 | 653 |
| μ | 0 | 0.05 | 0 | 0 |

It is to be understood from FIG. 2 to FIG. 5 that the values $f_0$ for all wavelengths of the trap frequency coincide with each other, thus producing an excellent low-pass performance.

For higher frequencies than the trap frequency $f_0$, the larger the value of the height $\delta$, the smaller the value of MTF(f) becomes. From this reason, increasing of the height $\delta$ leads to a possibility of laying more suppression on the aliasing.

However, the equation (22) teaches that if the height $\delta$ is too much increased, the period "d" of the trapezoids must be taken at a larger value in proportion to the height $\delta$. Otherwise, the trap frequency $f_0$ could not be maintained at the constant value. As a result, there arises an occasion that when the diaphragm of the photographic system is stopped down, the low-pass filter fails to function as the diffraction grating.

For this reason, for the height $\delta$, there is a need to choose an optimum value depending on the photographic optical system to be used.

According to the invention, the optical low-pass filter is constructed in the form of a periodic arrangement of a controlled trapezoid wave in profile by the above-described rules of design, thereby making it possible to obtain a low-pass effect which is uniform throughout a prescribed wavelength range. Thus, a photographic system having the optical low-pass filter of high imaging performance has been achieved.

What is claimed is:

1. An optical low-pass filter, satisfying the following conditions:

a profile of said filter being of a trapezoid wave form, and for a wavelength range of $\lambda_M \leq 1.6 \lambda m$, $$\frac{\lambda_D - \lambda_m}{\lambda_M - \lambda_m} \geq 0.3$$

-continued $0.35 \leq \epsilon \leq 0.65$
$-0.26 \leq \mu \leq 0.26$
where
$$\epsilon = \frac{a+b}{d}, \mu = \frac{a-b}{d}$$

$$\lambda_D = MIN\left(\frac{2MIN(a,b)}{d}, 1-\epsilon\right) \times \frac{2(n-1)\delta}{1-\epsilon}$$

wherein "a" is a width of a flat portion of a top side of said trapezoid wave form, "b" is a width of a flat portion of a bottom side thereof, "δ" is a height thereof, "d" is a length of one period thereof, "n" is a refractive index of a material of said filter, $\lambda_M$ and $\lambda m$ are maximum and minimum wavelengths in a predetermined wavelength range respectively, and MIN(x,y) represents the smaller one of values which variables x and y take.

2. An optical low-pass filter, satisfying the following conditions:
a profile of said filter being of a trapezoid wave form, and for a wavelength range of $\lambda_M \leq 1.6 \lambda m$, $0.2 \leq a/d \leq 0.3$ $0.2 \leq b/d \leq 0.3$ $$\frac{\delta - \lambda_m}{\lambda_M - \lambda_m} \geq 0.3$$

wherein "a" is a width of a flat portion of a top side of said trapezoid wave form, "b" is a width of a flat portion of a bottom side thereof, "δ" is a height thereof, "d" is a length of one period thereof, and $\lambda_M$ and $\lambda m$ are maximum and minimum wavelengths in a predetermined wavelength range respectively.

3. A photographic system comprising:
an objective lens assembly having a plurality of lens units;
a solid state image pickup element receptive of an image of an object produced by said objective lens assembly for forming video signals; and
an optical low-pass filter arranged in a space between adjacent two of said lens units, and satisfying the following conditions:
a profile of said filter being of a trapezoid wave form, and for a wavelength range of $\lambda_M \leq 1.6 \lambda m$, $$\frac{\lambda_D - \lambda_m}{\lambda_M - \lambda_m} \geq 0.3$$

$0.35 \leq \epsilon \leq 0.65$
$-0.26 \leq \mu \leq 0.26$
where
$$\lambda = \frac{a+b}{d}, \mu = \frac{a-b}{d}$$

$$\lambda_D = MIN\left(\frac{2MIN(a,b)}{d}, 1-\epsilon\right) \cdot \frac{2(n-1)\delta}{1-\epsilon}$$

wherein "a" is a width of a flat portion of a top side of said trapezoid wave form, "b" is a width of a flat portion of a bottom side thereof, "δ" is a height thereof, "d" is a length of one period thereof, "n" is a refractive index of a material of said filter, $\lambda_M$ and $\lambda m$ are maximum and minimum wavelengths in a predetermined wavelength range respectively, and MIN(x,y) represents the smaller one of values which variables x and y take.

4. A photographic system comprising:
an objective lens assembly having a plurality of lens units;
a solid state image pickup element receptive of an image of an object by said objective lens assembly for forming video signals; and
an optical low-pass filter arranged in a space between adjacent two of said lens units, and satisfying the following conditions:
a profile of said filter being of a trapezoid wave form, and for a wavelength range of $\lambda_M \leq 1.6 \lambda m$.

$0.2 \leq a/d \leq 0.3$ $0.2 \leq b/d \leq 0.3$ $$\frac{\delta - \lambda_m}{\lambda_M - \lambda_m} \geq 0.3$$

wherein "a" is a width of a flat portion of a top side of said trapezoid wave form, "b" is a width of a flat portion of a bottom side thereof, "δ" is a height thereof, "d" is a length of one period thereof, and $\lambda_M$ and $\lambda m$ are maximum and minimum wavelengths in a predetermined wavelength range respectively.

\* \* \* \* \*

UNITED STATES PATENT AND TRADEMARK OFFICE
CERTIFICATE OF CORRECTION

PATENT NO. : 4,998,801

DATED : March 12, 1991

INVENTOR(S) : Shiraishi et al.

It is certified that error appears in the above-identified patent and that said Letters Patent is hereby corrected as shown below:

ON THE COVER PAGE

At [56], third line in the second column, "Grating" should read --Groove--.

COLUMN 1

Line 54, "beam." should read --light beam.--

COLUMN 2

Line 1, "likewise" should be deleted.
    Line 26, "smaller" should read --gets smaller--.

COLUMN 7

Line 7, "ing" should read --ed--.

UNITED STATES PATENT AND TRADEMARK OFFICE
CERTIFICATE OF CORRECTION

PATENT NO. : 4,998,801
DATED : March 12, 1991
INVENTOR(S) : Shiraishi et al.

It is certified that error appears in the above-identified patent and that said Letters Patent is hereby corrected as shown below:

COLUMN 8

Line 6, " "β" " should read --"Σ"--.
Line 22, "bring advanta-" should read --bring its advanta- --.
Line 23, "its effect" should be deleted.

COLUMN 9

Line 17, " $\lambda_D = \delta$    (38)" should read -- $\lambda_D \approx \delta$    (38)--.

Line 52, " $\lambda_M = 740$ nm$_x$)." should read -- $\lambda_M = 740$ nm).

IN THE CLAIMS

COLUMN 10

Line 64, " $\lambda_M \leq 1.6 \lambda m$," should read -- $\lambda_M \geq 1.6 \lambda m$,--.

COLUMN 11

Line 24, " $\lambda_M \leq 1.6 \lambda m$," should read -- $\lambda_M \geq 1.6 \lambda m$,--.

UNITED STATES PATENT AND TRADEMARK OFFICE
CERTIFICATE OF CORRECTION

PATENT NO. : 4,998,801

DATED : March 12, 1991

INVENTOR(S) : Shiraishi et al.

It is certified that error appears in the above-identified patent and that said Letters Patent is hereby corrected as shown below:

COLUMN 12

Line 2, "$\lambda_M \leq 1.6 \lambda m,$" should read -- $\lambda_M \geq 1.6 \lambda m,$ --.

Line 35, "$\lambda_M \leq 1.6 \lambda m,$" should read -- $\lambda_M \geq 1.6 \lambda m,$ --.

Signed and Sealed this

Twenty-ninth Day of December, 1992

Attest:

DOUGLAS B. COMER

Attesting Officer

Acting Commissioner of Patents and Trademarks